US007089699B2

(12) United States Patent
Borgeat (10) Patent No.: US 7,089,699 B2
(45) Date of Patent: Aug. 15, 2006

(54) FLY FISHING ROD HAVING A DETACHABLE REEL SEAT AND WAIST HOLDER THEREFORE

(76) Inventor: Louis Borgeat, 817, Bellevue, Sainte-Foy, Québec (CA) G1V 2R6

( * ) Notice: Subject to any disclaimer, the term of this patent is extended or adjusted under 35 U.S.C. 154(b) by 0 days.

(21) Appl. No.: 10/660,520

(22) Filed: Sep. 12, 2003

(65) Prior Publication Data

US 2005/0034351 A1  Feb. 17, 2005

Related U.S. Application Data

(62) Division of application No. 09/882,092, filed on Jun. 18, 2001, now abandoned.

(51) Int. Cl.
*A01K 87/00* (2006.01)
*A01K 87/06* (2006.01)

(52) U.S. Cl. .................. 43/18.1 CT; 43/22; 43/18.1 R (58) Field of Classification Search .................... 43/22, 43/23, 21.2, 18.1 R, 18.1 CT, 25
See application file for complete search history.

(56) References Cited

U.S. PATENT DOCUMENTS

| 828,557 A | 8/1906 | Levison | |
|---|---|---|---|
| 1,013,333 A | 1/1912 | Tredwell | |
| 1,902,749 A * | 3/1933 | Baird et al. .................... | 43/22 |
| 2,018,923 A | 10/1935 | Potter | |
| 2,182,409 A * | 12/1939 | Richards ......................... | 43/22 |
| 2,260,885 A * | 10/1941 | Crosby ........................... | 43/22 |
| 2,361,189 A * | 10/1944 | Fratt ............................. | 224/162 |
| 2,456,681 A | 12/1948 | Culver | |
| 2,474,343 A * | 6/1949 | Burden ........................... | 43/22 |
| 2,512,082 A * | 6/1950 | Bainbridge et al. ............. | 43/22 |
| 2,612,714 A * | 10/1952 | Coleman ......................... | 43/22 |
| 2,616,204 A * | 11/1952 | Bennett .......................... | 43/22 |
| 2,711,292 A * | 6/1955 | Taggart et al. ................. | 43/22 |
| 2,780,883 A * | 2/1957 | Macy ............................. | 43/22 |
| 2,782,547 A | 2/1957 | McMullin | |
| 2,995,855 A * | 8/1961 | Bell ............................. | 43/21.2 |
| 3,098,313 A * | 7/1963 | Portz ............................ | 43/22 |
| 3,175,323 A * | 3/1965 | Folke ............................ | 43/22 |
| 3,233,355 A * | 2/1966 | Chion ............................ | 43/22 |
| 3,419,992 A * | 1/1969 | Strahm .......................... | 43/22 |
| 3,433,446 A * | 3/1969 | Meder ............................ | 43/22 |
| 3,516,190 A * | 6/1970 | Cook ............................. | 43/21.2 |
| 3,556,365 A * | 1/1971 | Bull ............................. | 43/21.2 |

(Continued)

FOREIGN PATENT DOCUMENTS

DE  1813561 B1 * 3/1975

(Continued)

OTHER PUBLICATIONS

Marshall, Mel, How to Make Your Own Fishing Rods, 1978, pp. 93-97, 107-111, 134-137, Outdoor Life, New York.*

(Continued)

*Primary Examiner*—Darren W. Ark
(74) *Attorney, Agent, or Firm*—Ogilvy Renault, LLP (57) ABSTRACT

The present invention concerns a reel seat holding device for a movable reel and reel seat assembly for fly fishing rods. The holding device comprises a case that is arranged for releasably receiving the reel seat therein, when the reel and reel seat assembly is detached from a fly fishing rod. A device is provided for mounting the case on a fishing rod or an holder. The disclosure of the present invention also relates to a fly fishing rod with a movable reel and reel seat assembly and a waist holder for the holding device.

15 Claims, 5 Drawing Sheets

U.S. PATENT DOCUMENTS

| | | | |
|---|---|---|---|
| 3,653,144 A * | 4/1972 | Rocka | 43/21.2 |
| 3,811,215 A | 5/1974 | Fleischer | |
| 3,949,730 A * | 4/1976 | Schoenberger | 43/22 |
| 3,975,855 A * | 8/1976 | McKeown | 43/23 |
| 4,003,612 A * | 1/1977 | Munsell | 43/25 |
| 4,067,133 A | 1/1978 | Levingston | |
| 4,198,775 A * | 4/1980 | Leisner | 43/21.2 |
| 4,378,882 A * | 4/1983 | Miller | 43/22 |
| 4,467,548 A | 8/1984 | Tabor | |
| 4,498,641 A * | 2/1985 | Steudle | 43/22 |
| 4,800,668 A | 1/1989 | Burrough | |
| 4,815,228 A * | 3/1989 | Abel | 43/22 |
| 4,827,654 A * | 5/1989 | Roberts | 43/21.2 |
| 4,856,220 A * | 8/1989 | Oak et al. | 43/21.2 |
| 4,860,485 A | 8/1989 | Rhoton et al. | |
| 4,891,899 A * | 1/1990 | Wulff | 43/22 |
| 4,916,847 A * | 4/1990 | Rusgo | 43/21.2 |
| 4,916,848 A | 4/1990 | Childre | |
| 5,052,146 A * | 10/1991 | Resnick | 43/21.2 |
| 5,115,598 A * | 5/1992 | Shaw | 43/21.2 |
| 5,175,952 A | 1/1993 | Yamato | |
| 5,184,797 A * | 2/1993 | Hurner | 43/21.2 |
| 5,210,971 A * | 5/1993 | Efantis | 43/21.2 |
| 5,237,770 A * | 8/1993 | Creek | 43/22 |
| 5,263,275 A | 11/1993 | Rumbaugh | |
| 5,288,359 A | 2/1994 | Stobbie, IV et al. | |
| 5,358,158 A * | 10/1994 | Darr | 43/22 |
| 5,369,904 A | 12/1994 | Vogts et al. | |
| 5,437,122 A * | 8/1995 | Wilson | 43/21.2 |
| 5,446,989 A * | 9/1995 | Stange et al. | 43/21.2 |
| 5,460,306 A * | 10/1995 | Rudd | 43/21.2 |
| 5,511,336 A * | 4/1996 | Bishop | 43/21.2 |
| 5,522,169 A | 6/1996 | Heller | |
| 5,571,228 A * | 11/1996 | McMurtrie | 43/21.2 |
| 5,632,427 A * | 5/1997 | Gattuso et al. | 43/21.2 |
| 5,655,328 A * | 8/1997 | Childs et al. | 43/25 |
| 5,732,500 A * | 3/1998 | Fitzpatrick | 43/4 |
| 5,974,722 A * | 11/1999 | Kiser | 43/18.1 CT |
| 5,992,717 A * | 11/1999 | Clewes et al. | 43/21.2 |
| 6,029,872 A * | 2/2000 | Ellington | 43/21.2 |
| 6,105,301 A * | 8/2000 | Ohmura | 43/22 |
| 6,115,955 A * | 9/2000 | Sledge | 43/18.1 HR |
| 6,269,990 B1 * | 8/2001 | Gray | 43/21.2 |
| 6,626,409 B1 * | 9/2003 | Thompson | 43/21.2 |
| 6,802,150 B1 * | 10/2004 | Harden | 43/21.2 |

FOREIGN PATENT DOCUMENTS

| | | | |
|---|---|---|---|
| FR | 86758 | 2/1966 | |
| FR | 86758 B1 * | 2/1966 | 43/23 |
| FR | 1536443 | 7/1968 | |
| FR | 1536443 B1 * | 7/1968 | 43/23 |
| FR | 2653639 B1 * | 5/1991 | |
| FR | 2744329 B1 * | 8/1997 | |
| GB | 1562034 B1 * | 3/1980 | |
| JP | 7-227181 B1 * | 8/1995 | |
| JP | 2000-279073 B1 * | 10/2000 | |
| JP | 2001-333668 B1 * | 12/2001 | |
| JP | 02001333668 | 12/2001 | |
| WO | WO-95/09529 A1 * | 4/1995 | |

OTHER PUBLICATIONS

Pfeiffer, Boyd C, Tackle Care—The Tackle Maintenance Handbook, 1987, pp. 78, 79, Nick Lyons Books, New York.*

* cited by examiner

Fig. 3

FLY FISHING ROD HAVING A DETACHABLE REEL SEAT AND WAIST HOLDER THEREFORE

CROSS-REFERENCES

This application is a divisional of patent application Ser. No. 09/882,092 filed on Jun. 18, 2001 now abandoned, currently pending and which is hereby incorporated by reference in its entirety.

FIELD OF THE INVENTION

The present invention relates to the general field of fly-fishing and is particularly concerned with a fly fishing rod having a detachable reel seat and waist holder therefore. More particularly, the present invention relates to a reel seat holding device for a movable reel and reel seat assembly for fly fishing rods.

BACKGROUND OF THE ART

During most sport fishing activities such as fly casting, spin casting, bait casting and the like, an artificial lure or a live bait having a fishing line attached thereto is projected or cast into fish filled waters in hope that a fish will take the bait. Since most fishes are quite easily scared away by human presence, it is often desirable to cast the bait far away from the fisherman.

Typically, the energy which propels both the lure and the fishing line is stored and subsequently released by the fishing pole which conventionally consists of a thin elongated flexible rod. When the rod releases the potential energy contained therein, this energy is transformed into kinetic energy which is transmitted to the fishing lure and propels the latter over the surface of water away from the fisherman.

During both bait and spin casting activities, the lure or bait being relatively heavy, this causes the fishing rod to flex as the fisherman from the back cast starts the forward cast, thereby storing energy in the rod. At the end of the forward cast, as the rod straightens out, the line is released and allowed to move freely across the water away from the fisherman.

Conversely, in fly casting the artificial lures or flies used are very light weight and not capable of causing the rod to flex. In fact, the lures are so light weight that the resistance due to air friction cannot be overcome unless the fly is attached to a heavier object. Hence, a fly fisherman is really casting the fly line rather than the fly itself. A great deal of efforts has thus been extended on designing fly lines and tailoring casting methods to efficiently propel the line through the air.

Parallel to the search for fly-casting efficiency, other efforts have been made to lighten the fishing rod and reel as much as possible for the fisherman. This search for overall lightness in the fishing gear handled by the fisherman stems from the fact that each cast made to propel the lure the right distance requires constant and always well-controlled muscular efforts.

First, with each cast, the fisherman's arm has to transmit to the rod the energy required to send the line the required distance. That means the fisherman must either make many false throws in sequence to allow the line to go progressively farther or pull back the part of the line that is already in the water in a single sharp movement and then recast in another movement right after it has been pulled back. This effort is required each time the fisherman wants to return the lure to the surface of the water. Therefore a fisherman who casts his line twice a minute during a fishing day lasting eight hours will end up making close to 1,000 casts, all of them different. Furthermore, for each cast, the fisherman must have precise and firm control of the movement of the rod, which has to move through a well-defined axis to get the required propulsion.

Through years of refinement, fly casters have learned to control the loop created in the line by the casting motion. It is well known that this loop is one of the most important parameters for fly casters to control. Thus, fly casters must make subtle movement adjustments to maintain the line loop as small as possible. This is, in part, accomplished by keeping the rod tip in a substantially vertical plane with respect to the ground. These subtle movement adjustments in a somewhat non-ergonomic position may quickly lead to muscle fatigue which, in turn, may deter the overall enjoyment of the fly fishing casting activity. Furthermore, as the infrequently solicited muscles of the hand, wrist and arm become tired, the efficiency of the casting stroke will be lessened.

Accordingly, it would be desirable to provide a fly fishing rod that is lighter in weight than conventional fishing rods so as to lessen the risk of muscle fatigue. The prior art has recognized this need and, hence, has notably proposed various types of fishing equipment made out of lightweight material. Regarding the construction of the rod itself, the use of lighter and lighter materials, for example, graphite and graphite composites, has allowed for significant improvements. The same trend holds for reels, which are being made with ever-lighter metal alloys and with simpler and simpler mechanisms. But progress in this latter area has become less and less a factor in the search for lightness; in the end, it has provided limited improvement since a great portion of the weight resides in the reel and associated reel seat. Nowadays the fishing rods are somehow ⅓ to ⅕ the weight of the total combination of their reel and attachment.

Also, some rod holders have been proposed in order to reduce the fisherman's efforts. But rod holders have heretofore been designed for general-purpose rods almost exclusively. Prior art rod holders have been utterly unamenable to use with a fly rod, instead being configured to accommodate general-purpose rod and reel.

However, the general-purpose rod and reel is proportioned differently from a fly rod. The reel mounted on a general purpose rod is usually located some distance from the end of the rod most proximate to the reel, that is, the reel is farther up the rod, more towards the eyelets of the rod and farther from the end of the rod held in the fisherman's hand.

The fly rod and reel is proportioned quite differently. On a fly rod, the mounting for the reel is located very near the end of the pole where it would be held if it was a general-purpose rod. In fact, the fly rod is actually held by the fisherman in a different way than the general-purpose rod. When using a fly rod, the rod is griped above the reel, the hand of the fisherman being placed between the reel and the rod eyelets. Consequently, the handle end of the fly rod does not extend very far past the mounted fly rod. Essentially, the reel of a fly rod is mounted nearly at the end of the rod, while the general-purpose rod has its reel mounted about one third of the way up the rod towards the eyelets.

The prior art rod holders are constructed so that the end of the rod most proximate to the reel is inserted into the holder. These holders are usually tubular in construction, a configuration most suitable for holding the cylindrical fishing rod. This sort of holder will not work when used with a fly rod. As noted above, the fly rod has little to no handle extending below the reel. Hence, the prior art rod holder simply will not work satisfactorily with a fly rod. Furthermore, the idea of inserting the rod into a holder to take some weight off the fisherman does not work for fly fishing rods. Indeed, once the rod is in its holder, it becomes practically immobile, which is hardly compatible with a fishing style that involves repeated casts.

In order to reduce the weight of the fishing rod the prior art shows attempts at temporarily removing the fishing reel from the fishing rod. For example, U.S. Pat. No. 3,556,365, George Nulan inventor, issued Jan. 19, 1971, discloses a spinning reel transfer mechanism in which a mechanical holder for spinning reel is supported on a frame shaped to fit the contour of the fisherman's body and is attached to a belt for being buckled around the body of the fisherman. From a lower end of the support frame, there is a belt which is disposed for being connected with the belt at the rear of the person wearing it. It does provide means by which a reel is placed on an extension to the mechanical holder leaving the rod free in one hand to facilitate casting.

Although offering the advantage of reducing the overall weight of the fishing rod, the invention disclosed in the hereinabove mentioned patent, suffers from numerous drawbacks. One of the main disadvantages associated with this invention resided in that only the reel is separable from the rod. The intended user thus needs a reel seat which remains attached to the rod and a second reel seat attached to the belt. The intended user must therefore attach the reel to either one of the reel seats. This operation can prove to be both tedious and time consuming.

Accordingly, there exists a need for an improved fly fishing rod having a detachable reel seat and waist holder therefore.

SUMMARY OF THE INVENTION

The invention presented here comes within the perspective of the previous research in the sense that it seeks to enable the fisherman to cast with the lightest possible rod. However, it achieves this objective in a different way. It allows the fisherman to use a rod wherein he can choose, at any time, to detach the reel seat and, more importantly, the reel.

The invention is based on two important observations concerning the function of the reel in fly-fishing. First, practice has shown that the reel plays a secondary role in the casting and retrieval of the lure, since, with each cast, the line that has been cast does not have to be rewound onto the reel. Often, the fisherman does not reel any of it. If he does, he takes in only a small portion of it. Whatever the length of line he does reel in, he only winds up in his hand or lets fall around his feet or in the water this length of line. Doing so allows him to recast freely and rapidly, which he could not do if the line was rewound onto the reel.

Second, the reel, including the part of thereof that stays on the reel after a cast (often 30% to 50% of the line's entire length), is the heaviest part of the rod. The reel can easily be three times heavier than a rod of the highest quality. The technique that allows a person to fish without the reel attached to the rod means a lightening of equipment greater than what has been achieved to date by other inventions.

The fly fishing rod proposed by the present invention has a detachable reel seat which can be readily detached and attached from and to a conventional fly fishing rod through a set of simple ergonomic steps without requiring special tooling or manual dexterity. The attachment and detachment to and from the fly fishing rod can be accomplished quickly even in an harsh environment when manual skills are lessened by cold, humidity or the like.

The idea presented here of a rod with a detachable reel seat is applicable to a new rod specifically designed for that purpose and is equally applicable to all other existing rods. Indeed, the invention makes it possible to design a rod with a reel seat that can be detached from the rod handle instead of having to stay attached, as it is the case with all existing rods on the market. The invention also makes it possible for all existing rods to use a device for holding an additional and movable reel seat used to hold the reel.

Figures 4A, 4B:
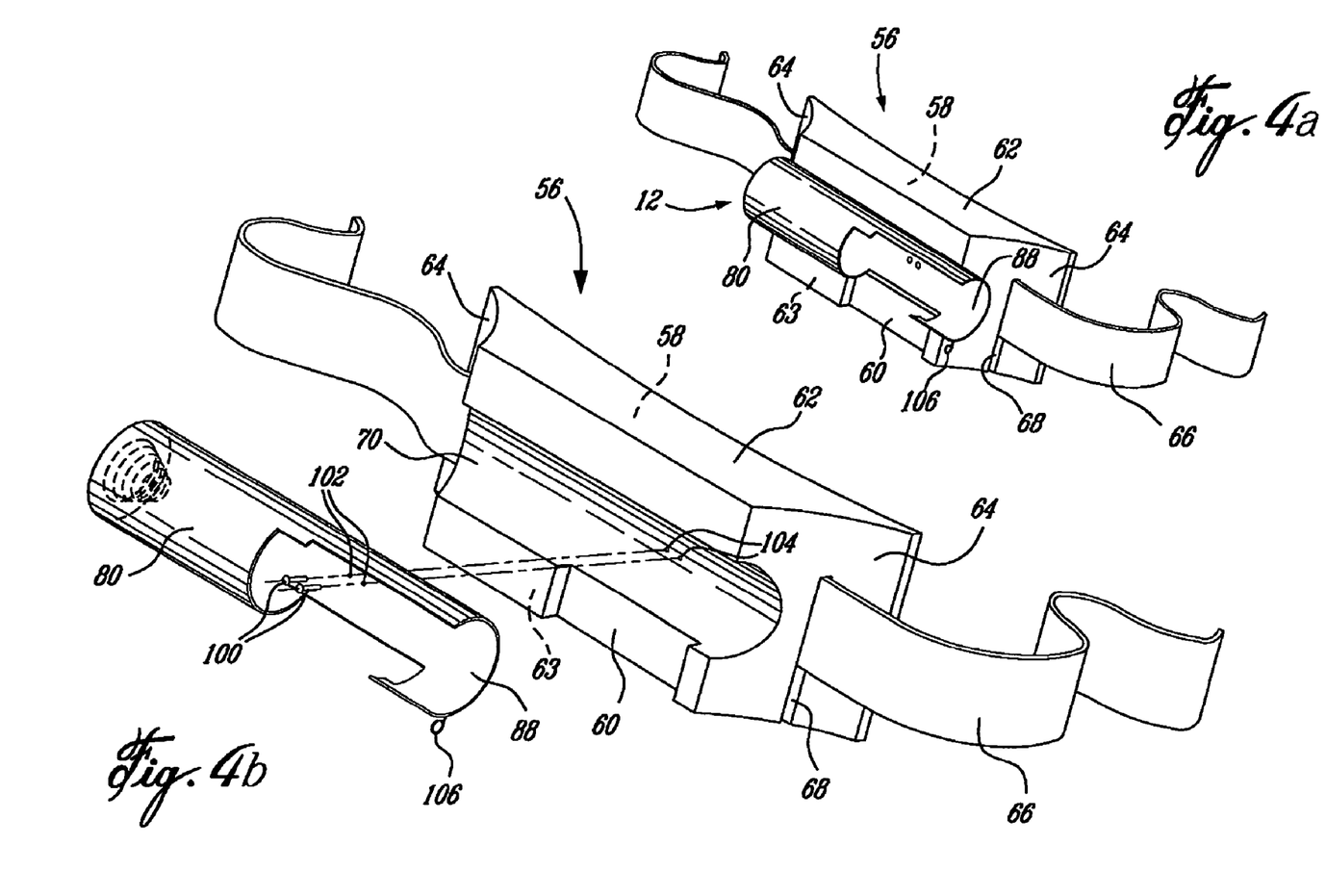
FIG. 4a is a perspective view illustrating a waist holder of the present invention with the cylinder shown in FIGS. 2a, 2b and 3 mounted thereto to hold the additional reel seat on a conventional rod
FIG. 4b is an exploded perspective view, of the waist holder and the cylinder.

In both cases, the reel seat is moved from the rod to a waist holder attached to the fisherman's belt. Reel seats, being somewhat of a more standard nature than the varying reels which are adapted to the user and the environment, can be quickly and ergonomically mounted on a relatively standard waist holder therefore. The proposed waist holder associated with the present invention is specifically adapted to receive a reel and reel seat assembly. The proposed waist holder is specifically designed so as to ergonomically position the reel and reel seat assembly (a right-handed will be using the right model as shown in FIG. 4 and will preferably install it on his right waist). It is also provide with a line positioning means, a guiding eyelet, which further increases ergonometric of the casting procedure.

An intended user of the proposed invention can thus use the fly fishing rod either with the reel and reel seat assembly attached thereto or detached therefrom depending on the particular setting. When desired or needed, the chosen option can be easily modified through simple ergonomic steps. The rod design with a detachable reel seat preserves all the advantages of the traditional rod equipped with its own fixed reel seat and, at the same time, allows the fisherman, whenever he wishes, to take advantages of all the benefits of a rod free from the weight of its reel.

Another advantage of the present invention resides in that the proposed fly fishing rod and associated waist holder is specifically designed so as to be manufacturable using conventional forms of manufacturing thus providing a fly fishing rod and associated waist holder which will be economically feasible, long lasting and relatively trouble free in operation.

According to a general aspect, there is provided a fishing rod which comprises a fishing rod shaft having a primary reel seat and at least one guiding eyelet extending from the fishing rod shaft for guiding a fishing line along the fishing rod shaft; a hollow cylinder having an outer surface, a longitudinal cavity defined therein, and a cylinder mounting foot protruding outwardly from the outer surface, the cylinder mounting foot being juxtaposed to and releasably engaged with the primary reel seat for mounting the hollow cylinder to the fishing rod shaft; and an auxiliary reel seat having a reel mounted thereto through a reel mounting foot, at least a portion of the auxiliary reel seat being releasably and slidably inserted into the cavity of the hollow cylinder with the reel extending outwardly therefrom, the at least one guiding eyelet guiding a fishing line from the reel along the fishing rod shaft by receiving the fishing line therethrough.

According to another general aspect, there is provided a fishing rod comprising a fishing rod shaft with a primary reel seat and at least one guiding eyelet extending from the fishing rod shaft; a hollow cylinder having a cylindrical wall defining a longitudinal cavity, an outer surface and an insertion opening, the hollow cylinder having a cylinder mounting foot extending outwardly from the outer surface of the cylindrical wall, the cylinder mounting foot being releasably engaged with the primary reel seat for mounting the hollow cylinder to the fishing rod shaft; and an auxiliary reel seat releasably and slidably inserted into the longitudinal cavity of the hollow cylinder, the auxiliary reel seat having a reel mounted thereon, the reel extending outwardly through the insertion opening, the at least one guiding eyelet guiding a fishing line from the reel along the fishing rod shaft by receiving the fishing line therethrough.

According to a further general aspect, there is provided a fishing rod comprising: a fishing rod shaft with a reel seat mounted to the fishing rod shaft; a hollow cylinder having a cylindrical wall defining an outer surface, a longitudinal cavity therein and an insertion opening therein, a cylinder mounting foot protruding outwardly from the outer surface, and a coil spring disposed inside said hollow cylinder at a closed end thereof, the cylinder mounting foot being releasably engaged with the reel seat for mounting the hollow cylinder to the fishing rod shaft; and a reel and reel seat assembly having a reel mounted to an auxiliary reel seat through a reel mounting foot, at least a portion of the auxiliary reel seat being releasably and slidably inserted into the cavity of the hollow cylinder with the reel extending outwardly therefrom through the insertion opening, said coil spring being compressed when the at least a portion of the auxiliary reel seat is inserted inside said hollow cylinder.

BRIEF DESCRIPTION OF THE DRAWINGS

Two embodiments of the present invention will now be disclosed, by way of examples, in reference to the following drawings.

DESCRIPTION OF THE PREFERRED EMBODIMENTS

Figures 1A, 1B, 1C:
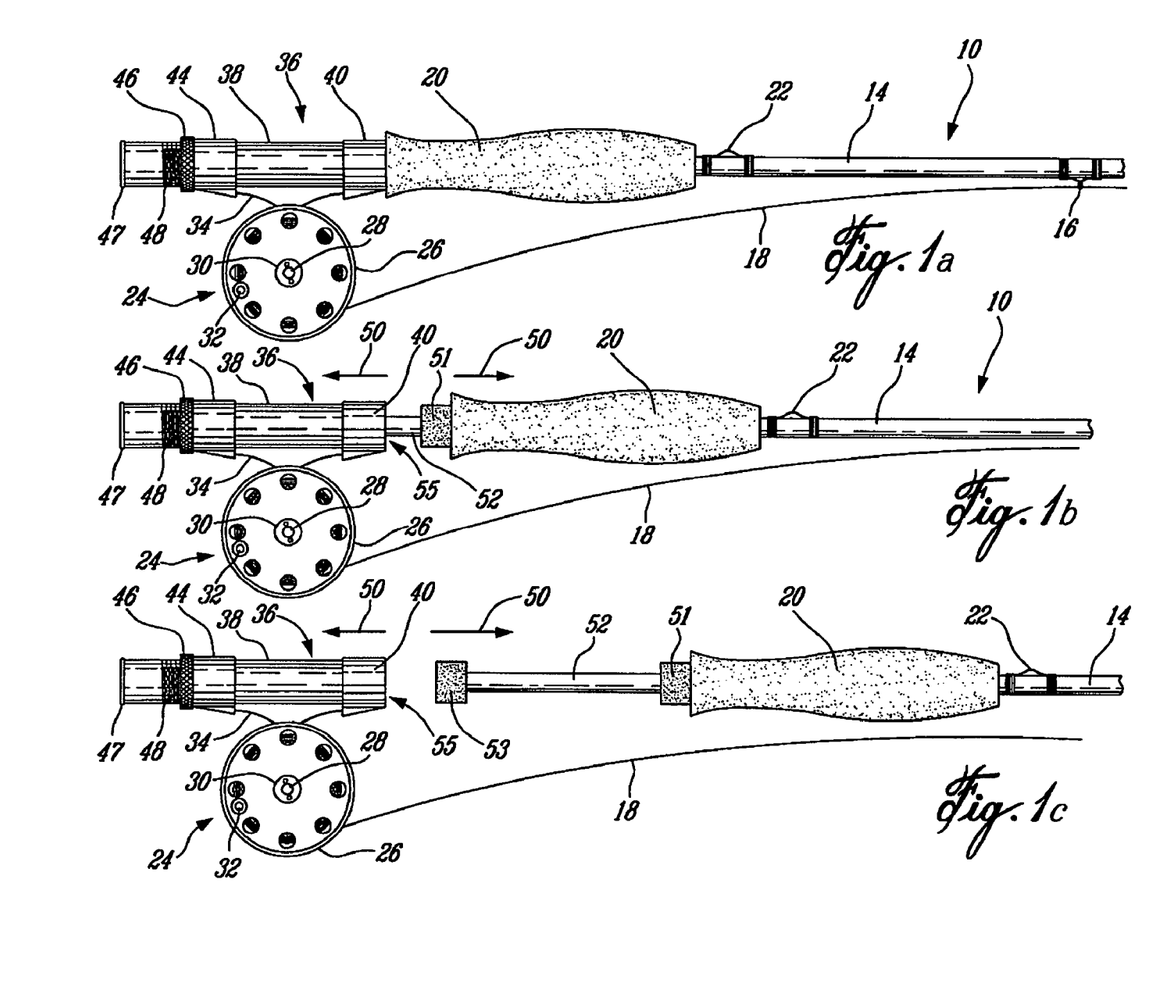
FIG. 1a is a side elevation view with sections taken out illustrating part of a fly fishing rod having a detachable reel seat in accordance with a first embodiment of the present invention with the reel seat being mounted to the fishing rod.
FIG. 1b is a side elevation view of the detachable reel seat being detached from or mounted to the fly fishing rod.
FIG. 1c is a side elevation view of the detachable reel seat detached from the remainder of the fishing rod.

Referring to FIG. 1, it is shown a fly fishing rod 10 in accordance with a first embodiment of the present invention.

The fishing rod 10 is preferably of the fly fishing type. The fishing rod 10 includes an elongated rod shaft 14 (only a butt section thereof being shown). A set of guiding eyelets 16 (only one of which is shown) are mounted on the rod shaft 14 for guiding a fly line 18 there along.

Typically, although by no means exclusively, the rod shaft 14 includes a tip section releasably attached to the butt section by a male/female ferrule combination as is well known in the art. The proximal end of the butt section part of the rod shaft 14 is attached to a general cylindrical handgrip 20. A keeper ring 22 is preferably mounted on the rod shaft 14 adjacent the hand grip 20.

The fishing rod 10 else includes a conventional fly reel 24 for winding the fly line 18. The fly reel 24 typically includes a spool 26 rotatably mounted on a reel frame by an axle 28 and having a drag 30 attached thereto. A spool handle 32 typically extends laterally from the spool 26. The fly reel 24 also includes a mounting foot 34 extending radially therefrom. The mounting foot 34 is adapted to be mounted on a reel seat 36 in abutment contact with a cylindrical reel seat base 38. This base has a butt cap 47 at its proximal end, but is open at its distal end 40.

The mounting foot 34 is adapted to be maintained in a predetermined relationship relative to the reel seat base 38 by frictional contact with two rings 40, 44 and a screw locking nut 46 threadably mounted on the threaded proximal end 48 of the reel seat base 38.

The fishing rod insofar described is somewhat similar to conventional fly fishing rods and modifications to the standard components may be made without departing from the scope of the present invention.

One of the main feature of the present invention resided in that the reel 24 and reel seat 36 combination is attachably connected to hand grip 20 by a reel and reel seat-to-hand grip releasable attachment means 50.

In a first embodiment of the invention, the reel and reel seat-to-hand grip attachment device 50 includes an attachment rod 52 (being normally a prolongation of the rod shaft 14) extending from the handgrip 20 in a direction opposite the rod shaft 14. The attachment 52 rod is ended with two resilient bushings 53 and 51 and a corresponding attachment bushing channel 55 extending through a connecting segment extending distally from the reel seat base 38 and design so the resilient bushings 53 and 51 are inserted tightly into the bushing channel 55.

It should be understood that the other reel and reel seat combination to-handle attachment device could be used without departing from the scope of the present invention as long as they allow for efficient releasable connection there between.

Figures 2A, 2B:
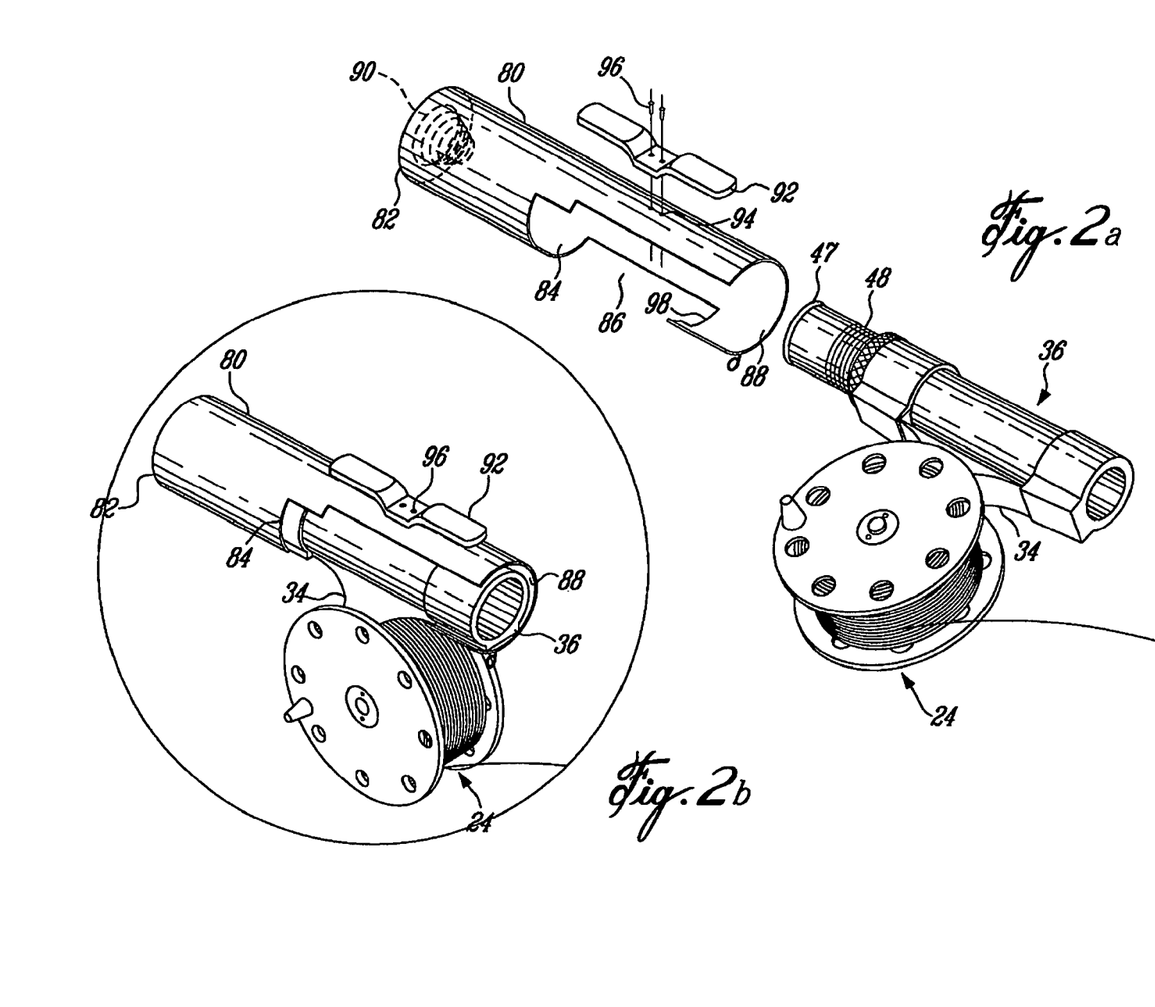
FIG. 2a is a perspective view illustrating a sleeve-like adapter having a reel mounted thereto and a cylinder with an opening, which runs from its top down along one side, and adapted for receiving the sleeve-like adapter therein, the sleeve-like adapter being shown before being inserted in the opening of the cylinder
FIG. 2b is a perspective view of the sleeve-like adapter after the adapter has been inserted in the opening of the cylinder.

FIG. 2 presents a second embodiment of the invention, namely the device used to hold or release an additional reel seat 36 accompanying any conventional fly fishing rod 10.

The main part of this device is a hollow cylinder 80 that is preferably made of metal or plastic. This cylinder 80 is closed at its proximal end 82, partially open on one of its sides 84 and its lower part 86, and fully open at its distal end 88.

Inside the cylinder 80, at the closed end 82, is a coil spring 90 in the form of a cone. At the middle of the topside of the cylinder 80, a mounting foot 92 is attached in two holes 94, preferably with rivets or bolts 96. This mounting foot 92 is used to attach the cylinder 80 to the reel seat 36 of the fly fishing rod 10. The mounting foot 92 is somewhat similar in its form, and wholly identical in its function, to the mounting foot 34 used to attach a reel 24 to a reel seat 36.

The purpose of the cylinder 80 is to hold a reel seat 36, equipped with a reel 24, in such a way that both are very easily removable. To insert them into the cylinder 80, it is necessary to place the proximal end 48 of the reel seat 36 into the opening 88 of the cylinder 80 and to slide it to the bottom 82 while pivoting the reel 24 laterally about 90 degrees to the ground (as illustrated in the main drawing in FIG. 2), so that it will fit into the cylinder's side opening 84. When the butt cap 47 of the reel seat 36 sits on and compresses the coil spring 90 at the bottom 82 of the cylinder 80, it is necessary to return the reel 24 to its normal vertical position. This is done by pivoting it inside the lower opening 86 of the cylinder 80, all the while taking care to insert the mounting foot 34 of the reel 24 into the narrow groove 98 at the top of the lower opening 86. The pressure exerted by the compressed spring 90 on the mounting foot 34 holds the reel seats 36 and reel 24 firmly in place inside the cylinder 80.

Figure 3:
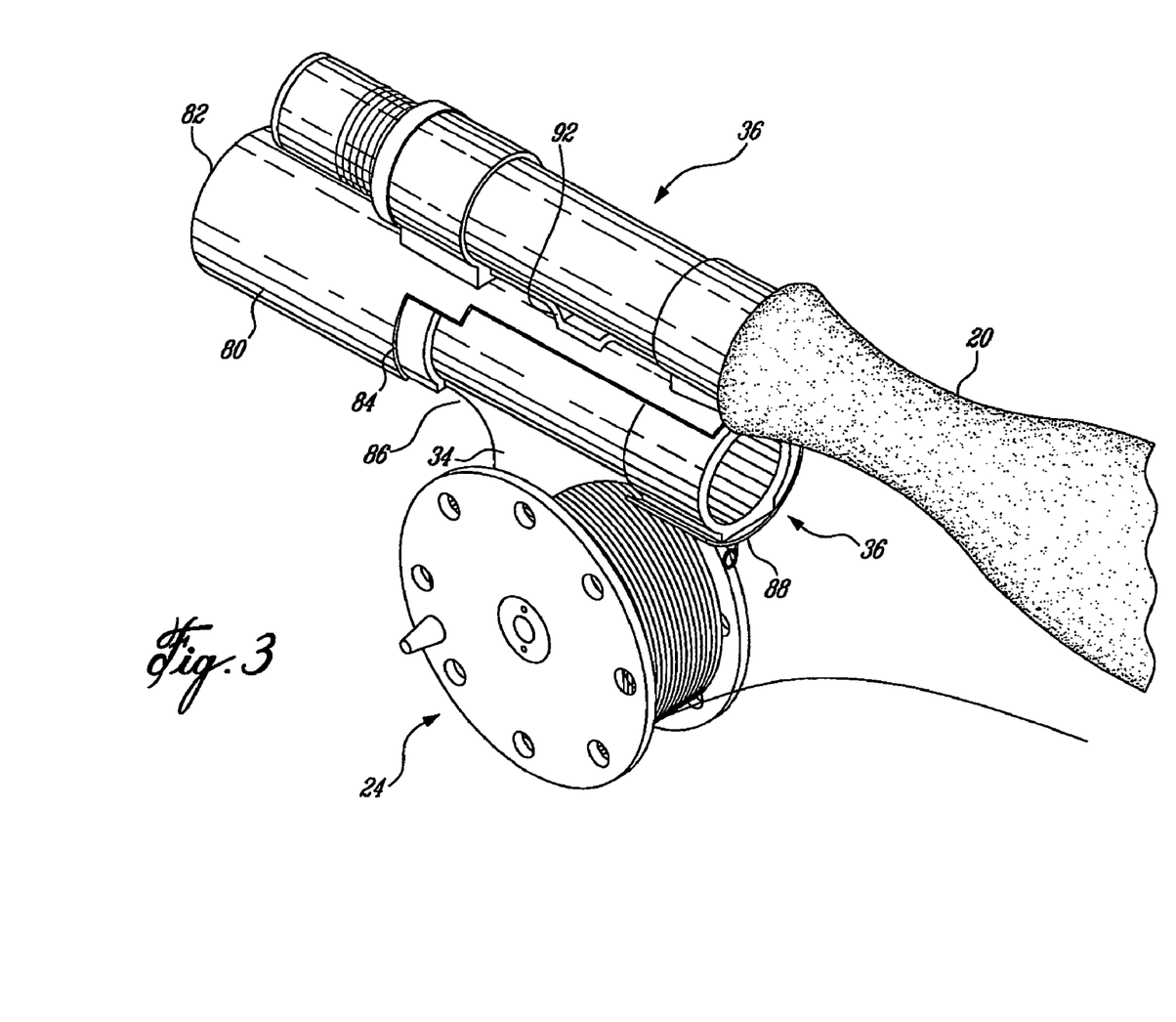
FIG. 3 is a perspective view illustrating the sleeve-like adapter and the cylinder shown in FIGS. 2a and 2b once installed in place, behind the handgrip and on the original reel seat of the rod, where the reel is normally attached.

The drawing on the lower left side of FIG. 2 illustrates the final position of the reel seat 36 and reel 24 in the cylinder 80. FIG. 3 shows the cylinder 80 (holding the reel seat 36 and reel 24) attached to a conventional handgrip rod 20 and ready to be used.

The fisherman can thus fish with a reel seat 36 and reel 24 which, whenever he chooses, can be detached from the hand grip 10 and held on a support at his waist 12. To detach them from the cylinder 80, all that needs to be done is to perform the opposite of the operation described above: push the reel seat 36 towards the bottom 82 of the cylinder 80 to compress the spring 90 and release the mounting foot 34 from the groove 98 into which it has been inserted, then pivot the reel 24 sideways and slide the reel seat 36 and reel 24 out of the cylinder 80.

FIG. 4 shows the waist holder 12 on the fisherman's belt 66 (on the same side that he holds his fishing rod on). The holder 12 includes a holder base 56 made preferably of plastic or light metal. The holder base 56 defines a base inner surface 58, a base outer surface 60, a pair of opposed base lateral surfaces 64 and a pair of opposed base end surfaces 62, 63. The base inner surface 58 is preferably given a generally arcuate configuration about its longitudinal axis so as to substantially conform to the configuration of the contour of the waist of the intended fisherman.

Approximately half the distance between the base inner 58 and outer surfaces 60 is a slot 68, approximately 2 mm wide, open on the inferior surface of the base 63, running the length of the base 56 and following a curve identical to the curve of the inner surface 58 of the base 56. The fisherman slides his belt 66 into this slot 68 along the entire length of the base 56. Even though the belt 66 is held tightly in the slot 68, the waist holder 12 remains horizontally mobile and can still be removed by the fisherman.

On the outer surface 60 of the base is a groove 70 in the form of a semi-circle running across the entire length of the base 56. In this groove 70 is set a cylinder 80 similar to the one presented in FIGS. 2 and 3; this cylinder 80 is attached to the outer surface 60 of the base 56 of the waist holder 12 by two bolts or rivets 100, inserted in this outer surface 104 through two holes 102 in the cylinder 80. After the cylinder 80 has been attached to the base 56, its front end 88 runs about one centimetre past the edge of the waist holder's base 56 so that the fisherman can insert easily the reel seat 36 into the cylinder 80. On the inferior part of this front end 88 a laterally open eyelet 106 guides the fishing line 18 from the waist holder 12 to the rod 10.

This cylinder 80 allows the fisherman to insert the reel seat 36 and the reel 24 from his fishing rod 10 onto the waist holder 12, and then to detach them, following the procedure described in FIG. 2. The waist holder 12 is designed to hold either the detachable reel seat 36 seen in FIG. 1 or the movable reel seat 36 shown in FIGS. 2 and 3. It can thus be adapted to either of the two embodiments of this invention.

The waist holder 12 is configured, sized and positioned so that the fly line 18 is substantially in line with the handle 20 of the rod 10 and the latter is in its frontal casting position substantially horizontal and proximate to the waist of the intended user. Also the sufficient width of the holder base makes it well visible and easy to handle by the angler.

Figure 5A:
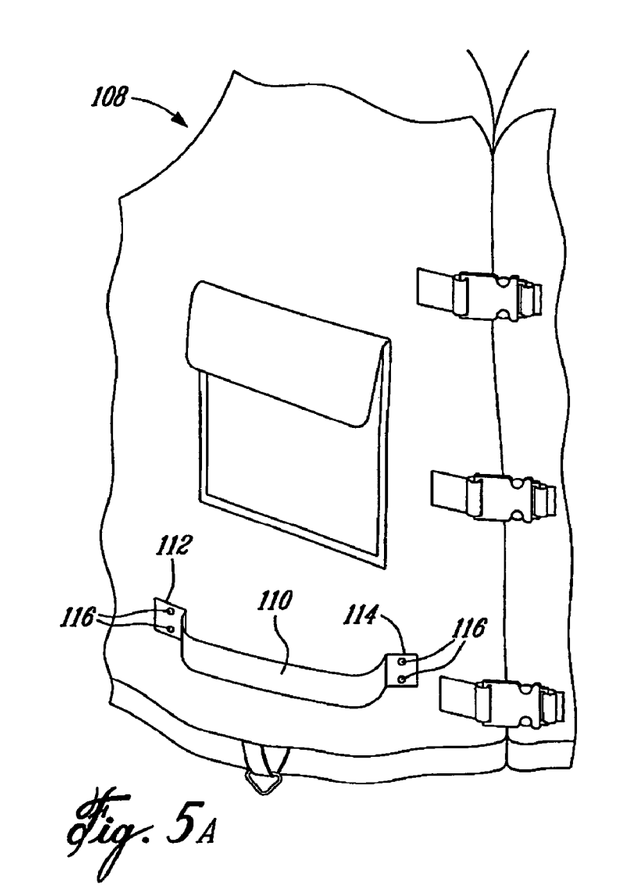
FIG. 5a is a perspective view illustrating a fishing vest or life jacket with a band.
Figure 5B:
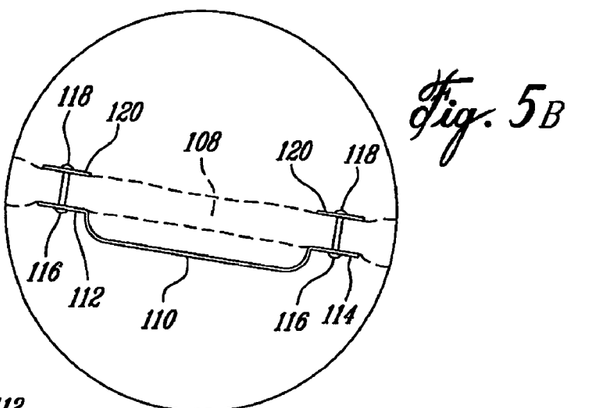
FIG. 5b is a cross-section view of the fishing vest or life jacket with the band.
Figure 5C:
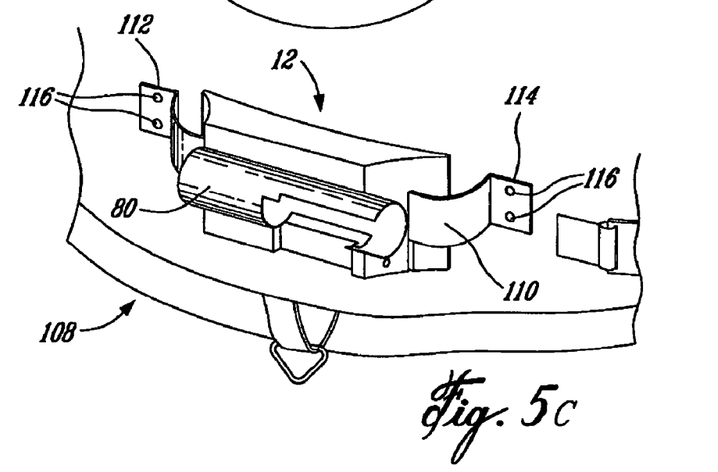
FIG. 5c is a perspective view of the fishing vest or life jacket with the band having the waist holder and the cylinder shown in FIGS. 4a and 4b mounted thereto, close to the fisherman's waist.

FIG. 5 illustrates a device allowing the waist holder 12 to be worn on the side of the fisherman's life jacket 108.

A rigid band 110, preferably made of plastic or metal, about as wide as a belt and only slightly longer than the waist holder 12 itself, can be attached to a life vest 108. The central (and main) part of the band 110 is slightly curved on its longitudinal axis so that it can be inserted into the slot 68 on the waist holder 12. At each end 112, 114 of this curved part, the band becomes flat and extends about three centimetres in an axis parallel to the fishing vest 108.

These tow ends 112, 114 of the band 110 are attached to the vest by four bolts 116 which go through these ends 112, 114 and the vest material 108. On the inside of the vest 108, nuts 118 tighten the bolts 116. These nuts 118 are supported against the inside of the vest 108 on two small plates 120, each 6-cm by 6-cm, and made of the same rigid materials as the band 110 itself.

Once the rigid band 110 is attached, the fisherman can install his waist holder 12 on it. He then can insert the reel 24 and the reel 36 from the rod 10 into the waist holder 12.

An identical band device can also be installed in the same way on the cloth-type vest that many fishermen wear.

I claim:

1. A fishing rod comprising:
    a fishing rod shaft having a primary reel seat and at least one guiding eyelet extending from the fishing rod shaft for guiding a fishing line along the fishing rod shaft;
    a hollow cylinder having an outer surface, a longitudinal cavity defined therein, and a cylinder mounting foot protruding outwardly from the outer surface, the cylinder mounting foot being juxtaposed to and releasably engaged with the primary reel seat for mounting the hollow cylinder to the fishing rod shaft; and
    an auxiliary reel seat having a reel mounted thereto through a reel mounting foot, at least a portion of the auxiliary reel seat being releasably and slidably inserted into the cavity of the hollow cylinder with the reel extending outwardly therefrom, the at least one guiding eyelet guiding a fishing line from the reel along the fishing rod shaft by receiving the fishing line therethrough.

2. A fishing rod according to claim 1, wherein the hollow cylinder comprises a cylindrical wall with an insertion opening therein, the reel extending outwardly through the insertion opening.

3. A fishing rod according to claim 2, comprising a resilient means disposed inside said hollow cylinder at a closed end thereof, said resilient means being compressed when the at least a portion of the auxiliary reel seat is inserted inside said hollow cylinder.

4. A fishing rod according to claim 3, wherein said resilient means is a coil spring.

5. A fishing rod according to claim 2, wherein the auxiliary reel seat and the reel define a reel and reel seat assembly and the insertion opening has an L-shape with a longitudinal portion and a transversal portion for releasably mounting the reel and reel seat assembly to the hollow cylinder.

6. A fishing rod according to claim 2, wherein said cylinder mounting foot is attached to the cylindrical wall of said hollow cylinder.

7. A fishing rod according to claim 1, wherein said hollow cylinder is made of plastic or metal.

8. A fishing rod according to claim 1, wherein said cylinder mounting foot is secured to the primary reel seat by frictional contact with at least one ring and at least one locking fastener.

9. A fishing rod according to claim 1, wherein the fishing rod shaft has a rip end, a rear end, and a handgrip mounted to the fishing rod shaft between the tip end and the rear end, the primary reel seat being mounted to the fishing rod shaft, rearwardly of the handgrip.

10. A fishing rod according to claim 1, wherein the hollow cylinder is juxtaposed to the fishing rod shaft.

11. A fishing rod according to claim 1, wherein the auxiliary reel seat is cylindrical and has an outer surface and the reel mounting foot is removably mounted to the outer surface of the auxiliary reel seat.

12. A fishing rod comprising:
   a fishing rod shaft with a primary reel seat and at least one guiding eyelet extending from the fishing rod shaft;
   a hollow cylinder having a cylindrical wall defining a longitudinal cavity, an outer surface and an insertion opening, the hollow cylinder having a cylinder mounting foot extending outwardly from the outer surface of the cylindrical wall, the cylinder mounting foot being releasably engaged with the primary reel seat for mounting the hollow cylinder to the fishing rod shaft; and
   an auxiliary reel seat releasably and slidably inserted into the longitudinal cavity of the hollow cylinder, the auxiliary reel seat having a reel mounted thereon, the reel extending outwardly through the insertion opening, the at least one guiding eyelet guiding a fishing line from the reel along the fishing rod shaft by receiving the fishing line therethrough.

13. A fishing rod according to claim 12, comprising a reel mounting foot for mounting the reel to the auxiliary reel seat.

14. A fishing rod according to claim 13, wherein the auxiliary reel seat has a cylindrical shape with an outer surface and the reel mounting foot is removably mounted to the outer surface of the auxiliary reel seat.

15. A fishing rod comprising:
   a fishing rod shaft with a reel seat mounted to the fishing rod shaft;
   a hollow cylinder having a cylindrical wall defining an outer surface, a longitudinal cavity therein and an insertion opening therein, a cylinder mounting foot protruding outwardly from the outer surface, and a coil spring disposed inside said hollow cylinder at a closed end thereof, the cylinder mounting foot being releasably engaged with the reel seat for mounting the hollow cylinder to the fishing rod shaft; and
   a reel and reel seat assembly having a reel mounted to an auxiliary reel seat through a reel seat mounting foot, at least a portion of the auxiliary reel seat being releasably and slidably inserted into the cavity of the hollow cylinder with the reel extending outwardly therefrom through the insertion opening, said coil spring being compressed when the at least a portion of the auxiliary reel seat is inserted inside said hollow cylinder.

* * * * *